Dec. 31, 1968        I. L. WISE ET AL        3,418,978
DISTORTING CONTACT LENS FOR ANIMALS

Filed Nov. 30, 1966

INVENTORS
Irvin L. Wise
Lester M. Hall
BY
Warren, Brosler,
Cypher & Anglin Attorneys Dec. 31, 1968   I. L. WISE ET AL   3,418,978
DISTORTING CONTACT LENS FOR ANIMALS INVENTORS
Irvin L. Wise
Lester M. Hall
BY Warren, Brosler, Cypher & Anglim Attorneys United States Patent Office 3,418,978
Patented Dec. 31, 1968

3,418,978
DISTORTING CONTACT LENS FOR ANIMALS
Irvin L. Wise, Santa Rosa, and Lester M. Hall, Merced, Calif., assignors to Vision Control, Inc., a corporation of California
Filed Nov. 30, 1966, Ser. No. 597,973
9 Claims. (Cl. 119—97)

ABSTRACT OF THE DISCLOSURE

A distorting contact lens for animals, especially fowl, is injection-molded through a gate passing through a protrusion in the concave surface of the mold which forms the outwardly convex optic portion of the lens and a central depression to cause distortion at the optical axis, air being discharged from another part of the mold cavity. As thus formed, the margin of the lens is smooth. The lens includes an inwardly recessed optic portion to be spaced from the cornea to provide a chamber which receives the nictitating membrane which normally underlies the bearing portion.

---

The invention relates to a distorting lens for animals, especially fowl, and to a method of forming such contact lens by injection molding a thermoplastic resin.

It has been found that behavior control of animals, such as laying chickens, ducks, pheasants, turkeys and other fowl as well as mamals, such as pigs, sheep, and cattle, can be achieved by applying distorting contact lenses which reduce the clarity with which the animals can see. Such lenses often obviate the need for sedatives or tranquilizers, which are often accompanied by deleterious effects, to reduce undesired animals activity such as fighting with each other, picking over mash to look for coarser particles or grains, flying within their area, and nervousness. For example, when applied to chickens they reduce food waste, expenditure of energy, noise, injuries, and resultant disease, dust and egg breakage, promote contentment and harmony, and increase the production of eggs. These lenses also eliminate the necessity for "debeaking" chickens. Similarly, such lenses are useful for horses, especially during transportation in reducing tension or excitement and maintaining a calm attitude among the horses. Similarly, two crops of lambs per year can be realized by the use of such lenses.

Contact lenses for fowl of known design produced distortion only by the curvature of the lenses and reduced vision only by such distortion and by pigmentation. They were molded in a manner to leave a rough edge at the outer margin of the area of injection which causes irritations and discomfort to the animal. Thus, by injecting molten material into the mold cavity from the margin this rough area was produced, and it was impossible or excessively costly to make them smooth.

Moreover, known contact lenses were oblong and did not remain permanently or dependably in the animal's eye. Thus, such lenses rotated with respect to the optical axis and had retention factors of the order of 50 to 80 percent.

The present invention provides an improved contact lens and method of molding the lens that overcomes the stated difficulties when all features are practiced; however, it will be understood that these features may be used separately.

In summary, according to one aspect, there is provided a contact lens of transparent material having a central optic portion that has a central depression in the said convex surface for producing distortion at the optical axis in addition to the distortion, if any, produced by the curvature of the optic portion. Such a lens is advantageously produced by injection molding, using a multi-part mold having a cavity of shape to form the lens, the molten material being injected through a small passage or "gate" that extends through a protuberance in the concave molding surface which forms the optic portion of the lens, gas, such as air, being exhausted from the cavity from another part of the cavity, e.g. at its central, lower section or at its margins. The margin of the lens is thereby smooth and free from flashing or burrs; if any burrs do occur, they are localized and can be easily removed.

In another aspect, the invention provides a contact lens in which the central optic portion has its inner surface recessed to be spaced from the cornea and provide a chamber. When applied to fowl, the nictitating membrane, which is situated beneath the peripheral bearing portion, can enter this chamber. The outer eyelids overlie the bearing portion.

In either embodiment, or when the two features are combined in a single embodiment, the contact lens is preferably of circular outline. This has the advantage of facilitating installation of the contact lens and of reducing the tendency for displacement of the lens from the eye.

The invention will be described in greater detail with reference to the accompanying drawings forming a part of this specification and showing a preferred embodiment by way of illustration, wherein.

Figure 1:
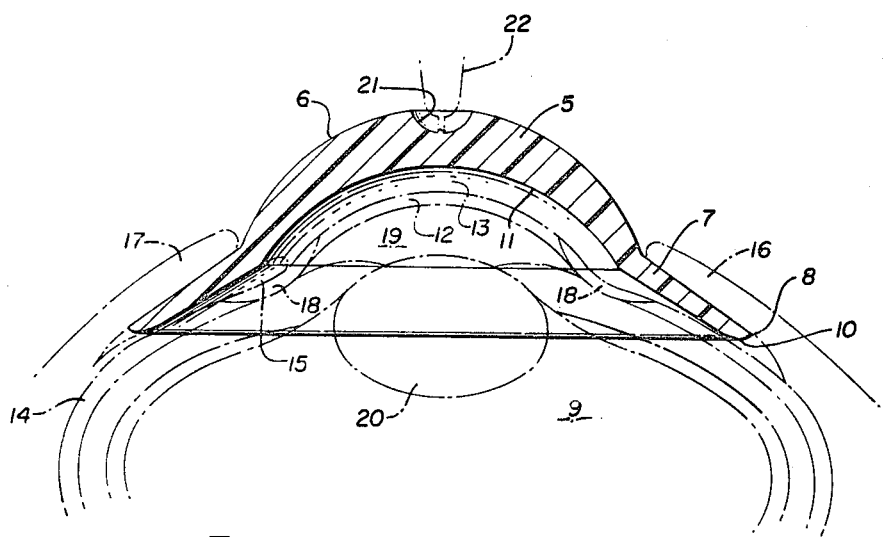
FIGURE 1 is a section of the contact lens, taken through a central plane through the optical axis, parts of the eye and eyelids of a chicken and of the mold being shown in phantom.

Referring to FIGURE 1, the contact lens consists of a body of transparent material, such as a thermoplastic resin, e.g. medium-density or low-density polyethylene or ethylvinyl acetate, either clear or pigmented. The lens includes a central optic portion 5 having a convex outer surface 6 and a peripheral bearing portion 7 having an outer circular margin 8 which lies within the limbus of the eye 9. The bearing portion slopes away from the outer surface of the central portion, e.g. is shaped substantially as the frustum of a cone, but may have its inner and outer surfaces curved slightly in section to conform it to the average contour of the eye. The thickness of the bearing portion preferably diminishes from the central portion to the margin, as shown, and the inner surface is rounded adjacently the margin, as appears at 10, to join the said inner surface to the outermost bounding surface of the lens. Thereby the lens is perfectly smooth at the inner surface. The outer surface may have an edge, as is shown, but this is not essential; it is also free from burrs.

The inner surface 11 of the central portion is concave, preferably with a radius of curvature different from, e.g. larger than, that of the outer surface 6, to produce distortion. Further, the inner surface 11 is recessed with respect to the peripheral portion so as to lie in spaced relation to the cornea 12 of the eye, providing a chamber 13. Further shown are the following parts of the eye: the sclera 14, nictitating membrane 15 (also called the third or inner eyelid), the outer eyelids 16 and 17, the scleral ring 18, anterior chamber 19 and lens 20. The peripheral bearing portion overlies the sclera 14 or scleral ring 18 (herein for convenience collectively called the sclera) and, when applied to fowl, also the nictitating membrane 15. This membrane can enter the chamber 13 when the fowl blinks its inner eyelid. The outer eyelids 16 and 17 overlie the peripheral bearing portion.

The central part of the outer surface 6 has a depression 21 which has a diameter which is a minor fraction of the diameter of the central optic portion 5, preferably less than one-fifth of this diameter, e.g. one-tenth of this diameter. The depression may be of any shape but is preferably round and concave in cross section as shown. This depression introduces added distortion into the lens at the optical axis. It is formed by the molding process, in which the molten material is injected into the mold through a gate 22 which is a fine passage passing through a protuberance in the mold surface.

Figure 3:
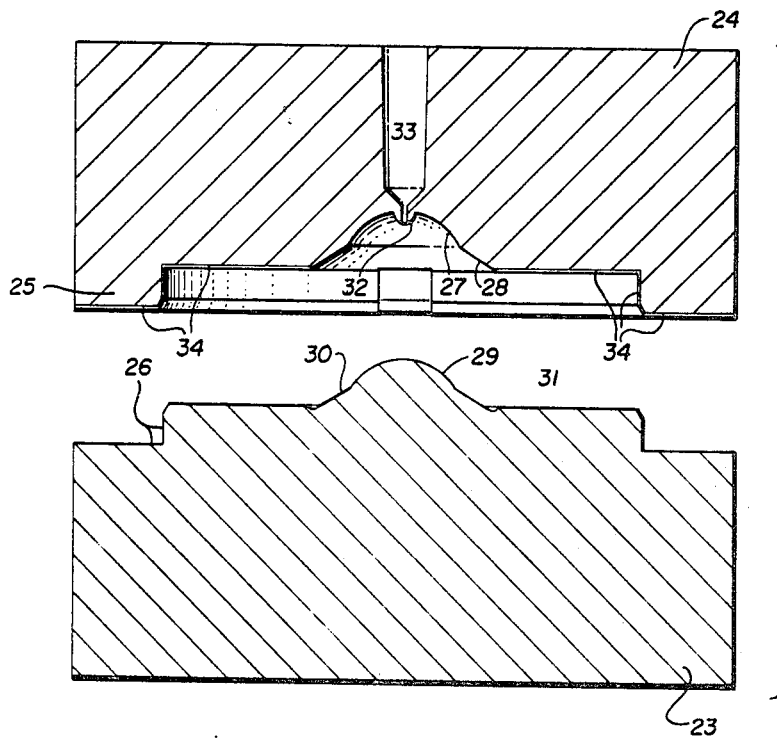
FIGURE 3 is a sectional view through a two-part mold showing the method of making the lens, the mold sections being separated.
Figure 4:
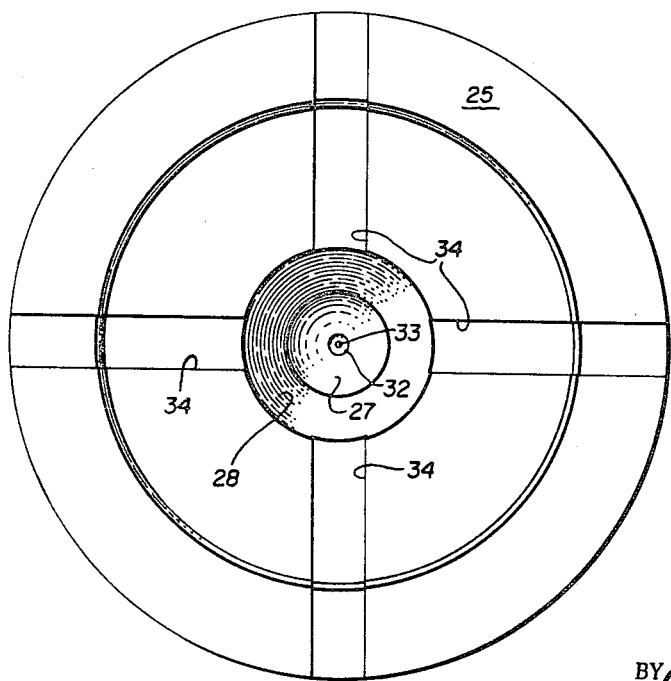
FIGURE 4 is a bottom plan of the uppermold section.

Referring to FIGURES 3 and 4, there is shown a two-part mold including a lower section 23 and an upper section 24, having guide means, such as an annular projection 25 on the upper and an annular recess 26 on the lower sections, for insuring alignment. The molding cavity is defined by molding surfaces 27 and 28 in the upper section for the upper surfaces of the central optic portion and peripheral bearing portions, respectively, and corresponding surfaces 29 and 30 on the lower section for molding the lower surfaces of these lens portions. The latter is rounded at its outer edge, as appears at 31, to produce a rounded margin in the lens. The surface 27 has a downward protuberance 32 through which extends a vertical passage or gate 33 for the supply of molten material. This gate is shown to be open to the top of the mold section, but it should be understood that in molds having several molding cavities for forming a plurality of lenses simultaneously, the gates to these cavities would be connected by runners, as is understood in the molding art. The mold is further provided with means for exhausting air, e.g. four radial vent channels 34 milled in the upper section to a very shallow depth, e.g. 0.0007 inch. It is evident that air can be vented in other ways, e.g. about a vertically movable stripper pin which may be provided at the center of the lower mold section to eject the hardened lens from the mold. Such a stripper pin is well known in the art.

In molding the lens molten material, such as a thermoplastic resin, is injected into the mold cavity through the gate 33 under pressure, and displaced air flows out through the vent channel 34. This channel is so fine that only gas flows through it, and there is no flow of the material; hence no flash is formed. When the lens has hardened, the mold sections are separated and the lens is removed, and breaking off of the ligament extending from the central depression 27 to the gate can be effected. The only irregularity is at the central depression 21 molded by the protuberance 32. This is desirable in a distorting lens in that it introduces blurring at the optical axis. The lens is perfectly smooth save at the center of the outer surface.

By way of a specific example, the following dimensions may be used in forming circular lenses for chickens:

| | | |
|---|---|---|
| Diameter of optical portion (measured at the inner surface) | inches | 0.36 |
| Diameter of lens | do | 0.585 |
| Maximum thickness of optical portion | do | 0.035 |
| Radius of outer surface, optical portion | do | 0.200 |
| Radius of inner surface, optical portion | do | 0.185 |
| Inclination of peripheral portion, angle from upper surface to base plane | deg | 34 |
| Thickness of peripheral portion— | | |
| Adjacent to optical portion | inch | 0.025 |
| At margin | do | 0.015 |
| Radius of curvature at outer margin | do | 0.031 |
| Depth of central depression | do | 0.015 |
| Maximum diameter of central depression | do | 0.031 |

Figure 2:
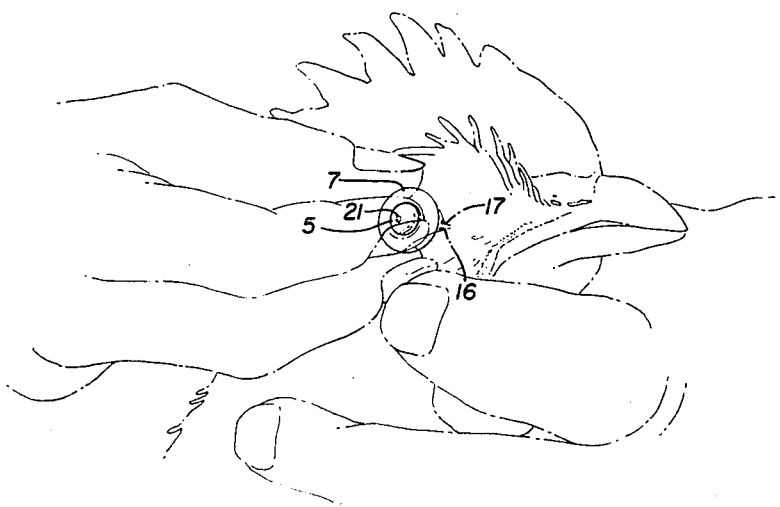
FIGURE 2 is a pictorial view of the lens during application to a chicken, other parts appearing in phantom.

The contact lens is applied to the animal, such as a chicken, as shown in FIGURE 1. This may be done with the fingers, by inserting the lens deeply under the lower, outer eyelid, and then pulling back the upper eyelid, permitting the lens to fall into place. The lens is then moved upwards to center it. A vacuum applicator can be used for holding the lens, but is not required. When installed, it has the relation to the eye shown in FIGURE 2.

The lens, being perfectly round and smooth at its edges, has a high retention factor and will not irritate the animal. The tapered and frusto-conical shape of the bearing portion 7 reduces weight while maintaining strength and conforms the lens to the shape of the eye.

The contact lenses of the invention may be of colorless transparent material or may be colored. For example, it is thought to be desirable to use a red color for lens, decreasing their attraction to blood and reducing the danger of cannibalism. On the other hand, clear lenses are preferred on males during the mating season. The affects produced by various pigmentations, however, are not as yet fully understood.

We claim:

1. A distorting contact lens for an eye of an animal formed of transparent material and having a central optic portion of concavo-convex shape and a peripheral bearing portion extending from and about the central portion and having an outer margin within the limbus of the eye to lie opposite the sclera, said central portion having on its outer surface substantially at the optical axis a depression having a diameter which is a minor fraction of the diameter of said central portion.

2. A contact lens as defined in claim 1 wherein said central portion has a recessed inner surface to be spaced from the cornea and said peripheral portion is formed substantially as the frustum of a cone, said depression being concave and having a diameter which is less than one-fifth of the diameter of the central portion.

3. A contact lense as defined in claim 1 wherein said peripheral portion slopes away from the outer surface of the central portion and said peripheral portion has a thickness which diminishes from said central portion to the margin.

4. A contact lens as defined in claim 3 wherein the inner surface of said peripheral portion is rounded near said margin to join smoothly said inner surface and the radially outermost bounding surface of the contact lens.

5. A contact lens as defined in claim 1 suitable for an eye of a fowl, wherein said margin is circular and at least a part of said peripheral portion is adapted to lie outside of the nictitating membrane and inside of the outer eyelids, said central portion having a recessed inner surface to be spaced from the cornea to form a chamber for receiving said nictitating membrane.

6. A contact lens as defined in claim 1 which is formed of a polymeric resin.

7. A distorting contact lens for an eye of a fowl formed of transparent material and having a central optic portion of concavo-convex shape and a peripheral bearing portion extending about the central portion and sloping therefrom away from the outer surface of the central portion, said peripheral portion having an outer margin within the limbus of the eye and of circular outline, said peripheral portion being adapted to lie outside of the nictitating membrane and inside of the outer eyelids, said central portion having a recessed inner surface to be spaced from the cornear to form a chamber for receiving said nictitating membrane.

8. A contact lens as defined in claim 7 wherein said peripheral portion has a thickness which diminishes from said central portion to the margin.

9. A contact lens as defined in claim 7 wherein the inner surface of said peripheral portion is rounded near said margin to join smoothly said inner surface and the radially outermost bounding surface of the contact lens.

References Cited

UNITED STATES PATENTS

| | | | |
|---|---|---|---|
| 2,181,070 | 11/1939 | Rudolph | 119—97 |
| 2,217,891 | 10/1940 | Cridlebaugh | 119—97 |
| 2,347,488 | 4/1944 | Lawlor et al. | 351—160 |
| 2,438,743 | 3/1948 | Feinbloom | 351—160 |
| 2,437,436 | 3/1948 | Mullen | 351—160 X |
| 2,644,985 | 7/1953 | Crandon | 351—160 X |

OTHER REFERENCES

"Contact Lenses Fitted to the Eyes of Fish," by Toline et al. from The American Journal of Optometry and Archives of the American Academy of Optometry, vol. 40, No. 3, March 1963, Re–1–A53, copy in Group 330.

"Contact Lenses for Chickens," from The Optician, vol. 146, No. 3786, Oct. 25, 1963, Re–1–065, p. 401.

ALDRICH F. MEDBERY, *Primary Examiner.*

U.S. Cl. X.R.

264—328; 351—160